United States Patent [19]

Mizusawa et al.

[11] 3,865,413

[45] Feb. 11, 1975

[54] PIPE JOINT

[75] Inventors: Shim-Ichiro Mizusawa, Okazaki; Tsutomu Hishiki, Nagoya, both of Japan

[73] Assignees: Toyota Jidosha Kogyo Kabushiki Kaisha, Toyota-shi, Aichi-ken; Sango Co., Ltd., Nagoya-shi, Aichi-ken, both of, Japan

[22] Filed: June 26, 1973

[21] Appl. No.: 373,749

[30] Foreign Application Priority Data
Sept. 8, 1972  Japan................................ 44-90174

[52] U.S. Cl................. 285/367, 285/411, 285/334.5
[51] Int. Cl................................................. F16l 17/00
[58] Field of Search........... 285/367, 366, 365, 273, 285/407–411, 334.5

[56] References Cited
UNITED STATES PATENTS

| | | | |
|---|---|---|---|
| 5,651 | 6/1848 | Thompson........................... | 285/411 |
| 2,269,664 | 1/1942 | Hallerberg..................... | 285/367 X |
| 2,828,986 | 4/1958 | Mahoff et al................... | 285/367 X |
| 3,144,264 | 8/1964 | Lewis et al.......................... | 285/367 |
| 3,788,677 | 1/1974 | Stade et al......................... | 285/367 |
| 3,794,360 | 2/1974 | Bachle et al.................... | 285/367 X |

*Primary Examiner*—Richard J. Scanlan, Jr.
*Attorney, Agent, or Firm*—Stevens, Davis, Miller & Mosher

[57] ABSTRACT

A pipe joint comprising a first tube, a second tube, a packing between the first and second tubes, and a substantially tubular joint body. The first tube has a flange at one end thereof and the second tube has a V-shaped annular projection adjacent one end thereof. The substantially tubular joint body has an annular tightening portion trapezoidal in section and coupling portions on each longitudinal side of the tightening portion. The second tube is inserted into the first tube with the packing interposed between their respective flanges. The joint body is then fitted around the first and second tubes and clamped. The tubes are thus securely connected together through the coupling between each tube and each coupling portion of the joint body. Also the flanges with the packing interposed therebetween are urged toward each other by the tightening portion of the joint body to thereby establish airtightness between the first and second tubes.

15 Claims, 12 Drawing Figures

PIPE JOINT

The present invention relates to a pipe joint for coupling tubes such as metal tubes and synthetic resin tubes.

A pipe joint of this type has hitherto been proposed and put into practical use in a variety of structures. Since, however, any prior-art pipe joint has intended to accomplish retention of airtightness and creation of coupling force with a single mechanism, there has not been previously attained one having both satisfactory airtight property and coupling property. In particular, the prior-art pipe joint has been incapable of sustaining the airtight property and the coupling property over a long period of time, resulting in the disadvantage of poor durability.

The first object of the present invention is to provide a pipe joint constructed such that first and second tubes are coupled through a coupling between a coupling portion at an end of the first tube and one coupling portion of a joint body fitted and tightened outside the coupling portion of the first tube and the coupling between a coupling portion at an end of the second tube and another coupling portion of the joint body, whereby both tubes can be securely connected with the joint body interposed therebetween.

The second object of the present invention is to provide a pipe joint constructed such that a flange disposed at an end of a first tube, an annular projection being V-shaped in longitudinal section disposed at an end of a second tube which includes a flange corresponding to the flange of the first tube, and a packing to be inserted between both the flanges of the first and second tubes are placed one over another, to form an annular joining portion trapezoidal in longitudinal section, and a tightening portion formed in a joint body is fitted onto the joining portion from the outside, to bring both inner side parts of the joint body relative to the tightening portion into contact with both sides relative to the joining portion and to thus tighten the joining portion in a manner to pressedly hold it between the aforesaid both sides, whereby the joining portion for both the first and second tubes is pressedly fastened to strongly retain airtightness between the first and second tubes.

The third object of the present invention is to provide a pipe joint constructed such that the coupling between the first and second tubes and the security of the airtightness between them are conducted by individual mechanisms taking charge of the respective functions, whereby no excessive burdens are imposed on the mechanism for effecting the coupling and the mechanism for securing the airtightness, so that it is possible to sustain the expected coupling force and the performance of retaining the airtightness over a long period of time and to increase the durability of the pipe joint.

The fourth object of the present invention is to provide a pipe joint which can be simply made, and a joint body which can be easily manufactured by plastic working of a metal plate.

The fifth object of the present invention is to provide a pipe joint according to which flanges of first and second tubes and a packing are placed one over another, to form a joining portion, a joint body is fitted around the first and second tubes including the joining portion, and the joint body is tensely fixed by a clamping means comprising a bolt or band, whereby the clamping means can be simply coupled without requiring any special tool or technique.

Preferred embodiments of this invention will now be described with reference to the accompanying drawings, in which.

As illustrated in these figures, the present invention relates to a pipe joint and includes a joint body for connecting a first tube 10 to a second tube 20. The joint body is fittedly mounted outside the tubes and airtightly couples the first and second tubes 10 and 20 together.

Figure 1:
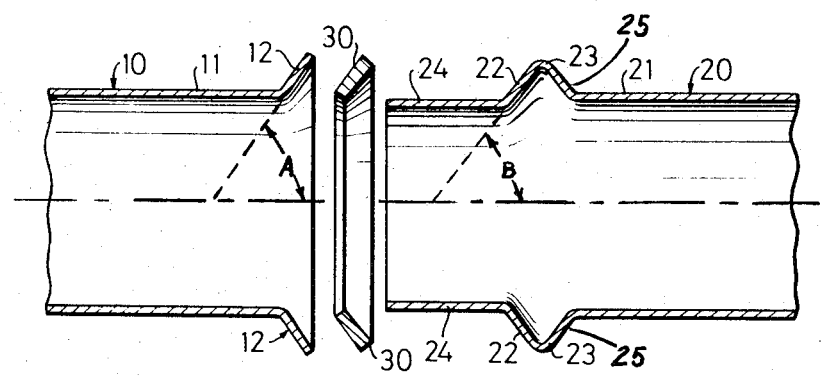
FIG. 1 is an exploded sectional view of a connection portion.

As shown in FIG. 1, the first tube 10 comprises a coupling portion 11 and a flange 12 formed at an end of the coupling portion 11. The flange 12 extends at an angle A relative to the centerline of the first tube 10. The second tube 20 comprises a coupling portion 21, an annular projection 23 V-shaped in section with the legs of the V forming flange portions 22 and 25, and terminates in a tubular portion 24. The bottom of the V is radially outward of the top of the V. The flange portion 22 of annular projection 23 extends at an angle B relative to the centerline of the second tube 20. The angle B is slightly less than but substantially the same as the angle A. A packing 30 is interposed between the flange 12 of the first tube 10 and the flange portion 22 of the second tube 20. The flange 12 of the first tube 10, the packing 30, and the projection 23 including the flange portion 22 of the second tube 20 are placed one upon another to form an annular joint which is trapezoidal in section.

In the FIG. 1 embodiment, the tubular portion 24 on the side of the flange portion 22 of the second tube 20 is so formed as to be receivably fitted into the coupling portion 11 of the first tube 10 to form a spigot.

With the flange 12 of the first tube 10, the packing 30 and the projection 23 including the flange portion 22 of the second tube 20 mounted upon one another, a joint body 601 is mounted over the coupling portion 11 and flange 12 of the first tube 10, the packing 30 and the projection 23, and the coupling portion 21 of the second tube 20.

Figure 6:
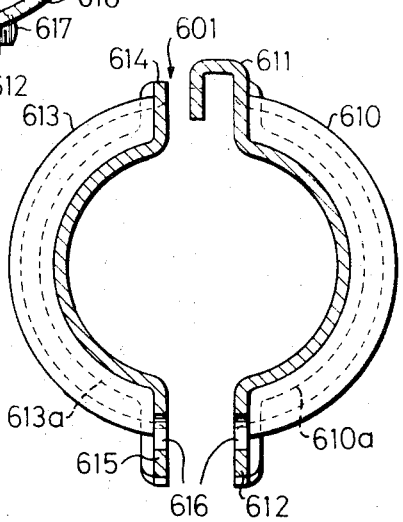
FIG. 6 is an exploded view of a joint body of the first embodiment.

The joint body 601 is the first embodiment of the joint body and is, as shown in FIG. 6, split into two parts comprising a right half portion or member 610 and a left half portion or member 613. The right half portion 610 is provided at its upper part with a receiving pawl 611 being U-shaped in section, and at its lower part with a flange 612. The left half portion 613 is provided at its upper part with a stopper pawl 614 to be engaged with the receiving pawl 611, and at its lower part with a flange 615 facing and parallel to the flange 612. The flanges 612 and 615 are formed with common bolt holes 616 and 616. Clamping means comprising bolts 617 and 617 are inserted through the holes to tightly couple the right half portion 610 and left half portion 613 together. Thus, the joint body 601 needs to only be clamped by bolts on one side thereof.

Figure 2:
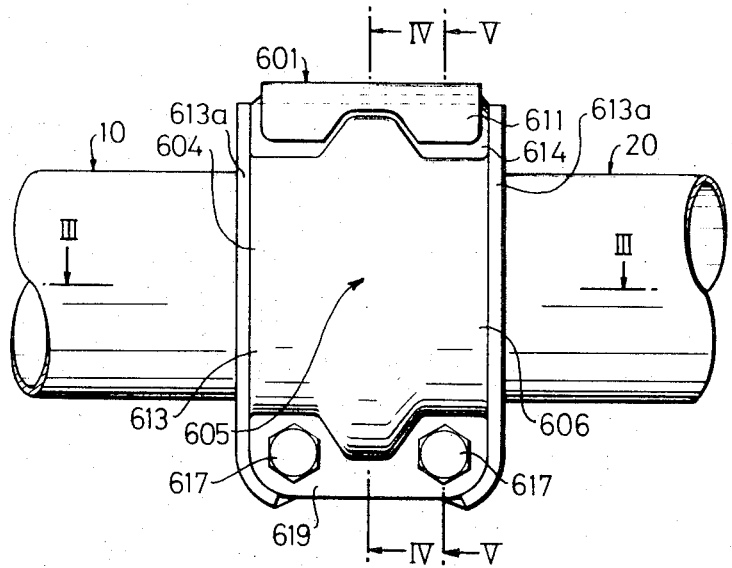
FIG. 2 is a front view of the first embodiment of the present invention.
Figure 3:
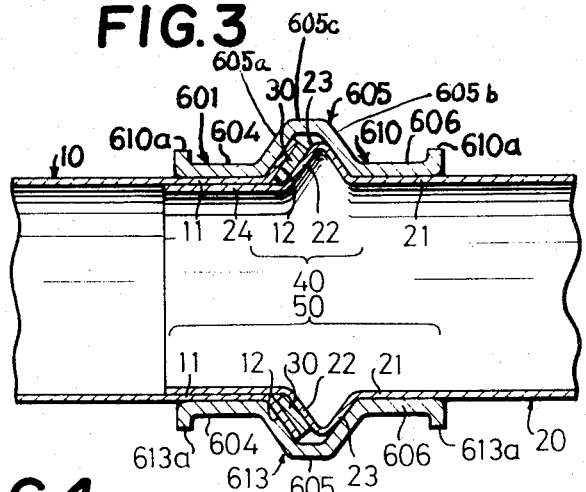
FIG. 3 is a horizontal sectional view taken along line III — III in FIG. 2.
Figure 4:
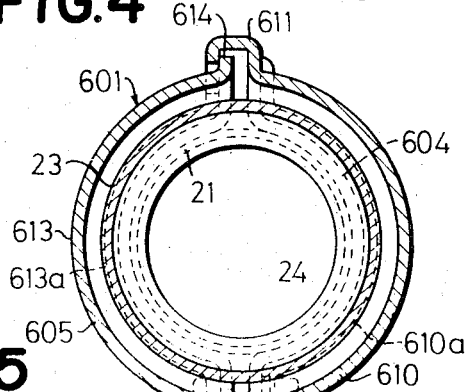
FIGS. 4 and 5 are vertical sectional views taken along line IV — IV and line V — V in FIG. 2, respectively.
Figure 5:
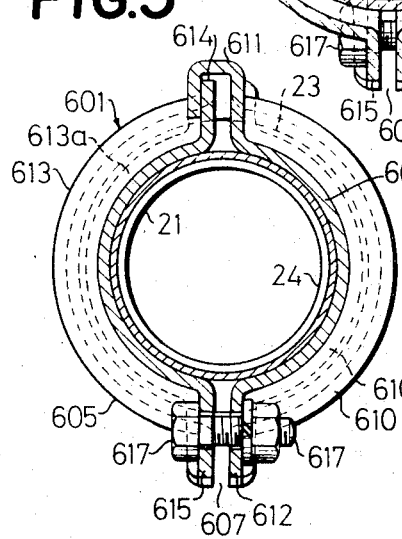

The joint body 601 is assembled by bringing the stopper pawl 614 of the left half portion 613 into engagement with the receiving pawl 611 of the right half portion 610. As assembled, as shown in FIGS. 2 and 3, the joint body 601 comprises a coupling portion 604 fittedly secured outside the coupling portion 11 of the first tube 10, a tightening or raised projecting portion 605 adapted to tighten and pressedly hold the projection 23 including the flange portion 22, the packing 30, and the flange 12 together between both sides thereof and towards its central part and a coupling portion 606 fittedly secured outside the coupling portion 21 of the second tube 20. The raised projecting portion 605 has a first portion 605a, second portion 605b, and a third substantially tubular portion 605c. The portion 605a abuts and extends over the flange 12, the portion 605b abuts and extends over the flange portion 25 and the portion 605c interconnects portions 605a and 605b. The tightening portion 605 tightens and holds the projection 23, the packing 30, and the flange 12 from the external side of the flange 12 opposite the packing 30 and from the external side of the flange portion 25. Further, as seen in FIGS. 4 and 5, a clearance 607 is provided between the opposing surfaces of the flanges 612 and 615 of the right and left half portions 610 and 613.

The joint body 601 is mounted in such way that it is fitted from the outside around the first and second tubes 10 and 20, and then the bolts 617 and 617 are tightened. With the joint body 601 mounted and the bolts 617 and 617 tightened, the first and second tubes 10 and 20 are coupled through the coupling between the coupling portion 11 of the first tube 10 and the coupling portion 604 of the joint body 601 and the coupling between the coupling portion 21 of the second tube 20 and the other coupling portion 606 of the joint body 601. By tightening the bolts 617 and 617, the portions 605b and 605b of the joint body 601 on both sides of the tightening portion 605 are brought into contact with the external side of the flange 12 of the first tube 10 and the external side of the flange portion 25 of the second tube respectively 20 to thereby tighten and pressedly hold the projection 23, the packing 30, and the flange 12 together. Thus, the flange 12 and the flange portion 22 are subjected to pressure so as to come closer to each other with the packing 30 held therebetween. As a result, airtightness is obtained between the first tube 10 and second tube 20.

In FIGS. 2 to 6, 610a designate ribs provided at both end faces of the right half portion 610 of the joint body 601, while 613a denotes ribs disposed at both end faces of the left half portion 613.

Figure 9:
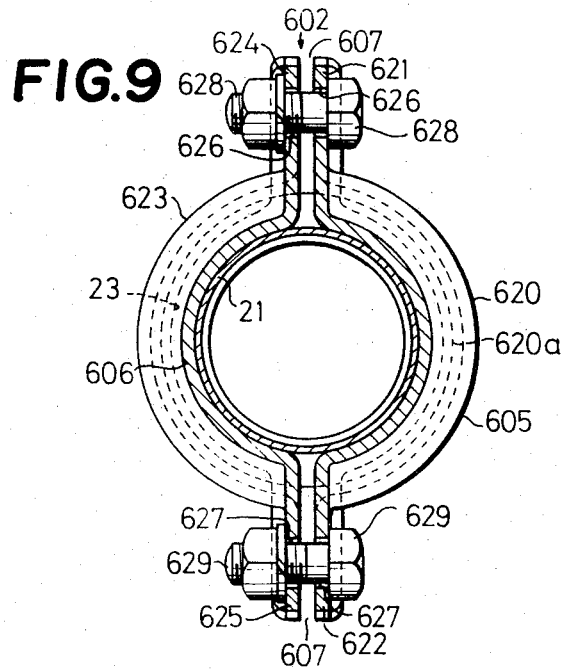
FIG. 9 is a vertical sectional view taken along line IX — IX in FIG. 7.

As illustrated in FIG. 9, a second embodiment of a joint body designated 602 is shown and is split into two parts comprising a right half portion or member 620 and a left portion or member 623. The right half portion 620 is provided with flanges 621 and 622 at its upper and lower parts, respectively. The left half portion 623 is provided with flanges 624 and 625 facing and parallel to to the flanges 621 and 622 at its upper and lower parts, respectively. The upper flanges 621 and 624 of the right and left half portions 620 and 623 are formed with common bolt holes 626, while the lower flanges 622 and 625 are formed with common bolt holes 627. Clamping means comprising bolts 628 and 629 are inserted through the respective bolt holes 626 and 627 and are tightened. Thus, the joint body 602 is clamped at each of the diametrically opposed sides thereof.

Figure 8:
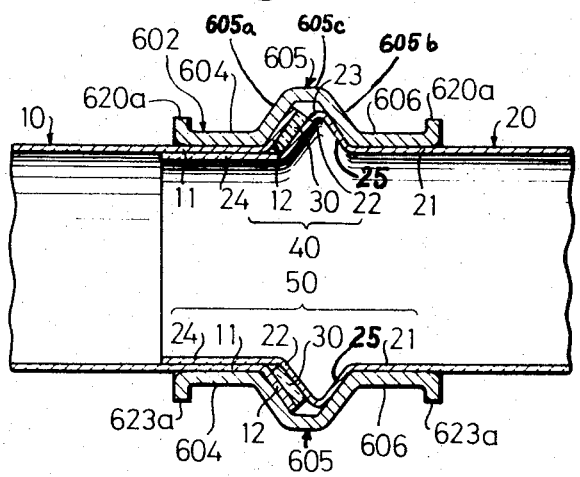
FIG. 8 is a horizontal sectional view taken along line VIII —VIII in FIG. 7.

Also with the right and left half portions 620 and 623 of the joint body 602 assembled, as shown in FIG. 8, the joint body 602 comprises a coupling portion 604 fittedly secured to the coupling portion 11 of the first tube 10, a tightening portion 605 adapted to tighten and pressedly hold the projection 23 including the flange portion 22, the packing 30, and the flange 12 together from the outer parts thereof towards the central part, and a coupling portion 606 fittedly secured to the coupling portion 21 of the second tube 20. As seen in FIG. 9, clearances 607 are formed between the flanges 621 and 624 and between the flanges 622 and 625.

The assemblage of the joint body 602 is carried out such that the right half portion or member 620 and the left half portion or member 623 are fitted around the first and second tubes 10 and 20 from the outside thereof, and then the bolts 628 and 629 are respectively inserted through the bolt holes 626 and 627 and tightened.

As assembled, the first and second tubes 10 and 20 are connected through the coupling between the coupling portion 11 of the first tube 10 and the coupling portion 604 of the joint body 602 and the coupling between the coupling portion 21 of the second tube 20 and other coupling portion 606 of the joint body 602. Simultaneously therewith, by tightening bolts 628 and 629 the portions 605a and 605b on the inside of the joint body 601 on both sides of the tightening portion 605 are brought into contact with the external side of the flange 12 of the first tube 10, and the external side of the flange portion 25 of the second tube 20 respectively to thereby tighten and pressedly hold the projection 23, the packing 30, and the flange 12 together. Airtightness is therefore obtained between the first tube 10 and second tube 20.

Figure 7:
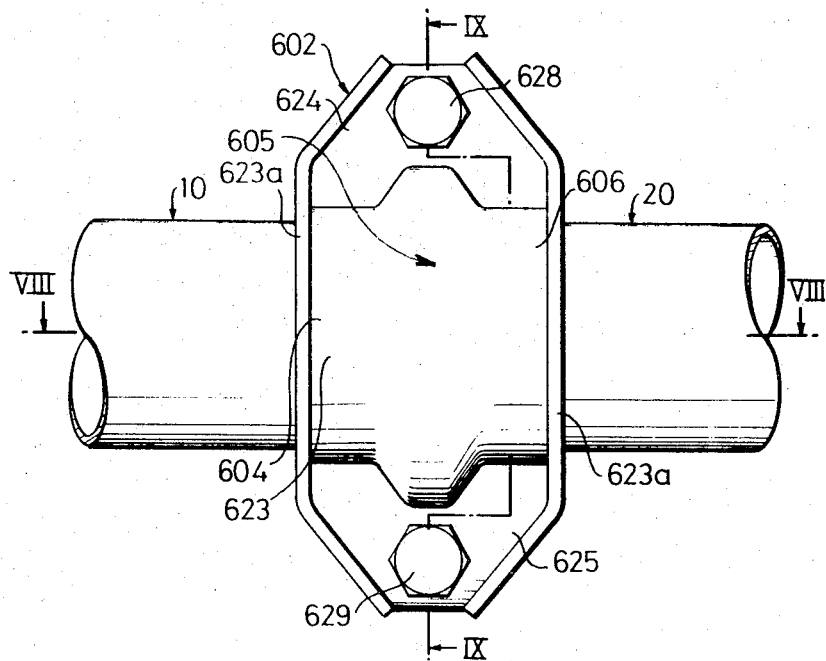
FIG. 7 is a front view of the second embodiment.

In FIGS. 7 and 9, 620a indicates ribs provided at both the ends of the right half portion 620, while 623a represents ribs disposed at both the ends of the left half portion 623.

Figure 12:
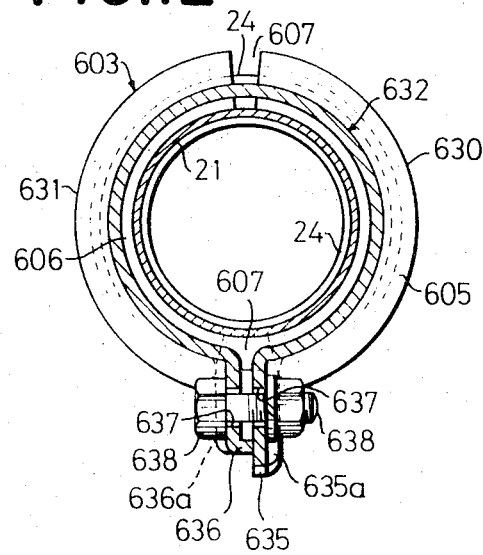

As illustrated in FIG. 12, a third embodiment of a joint body designated 603 is shown and is split into two parts comprising a right half portion or member 630 and a left half portion or member 631. The joint body 603 is made of the band tightening type in which the right and left half portions or members 630 and 631 are assembled by means of a band 632.

Figure 10:
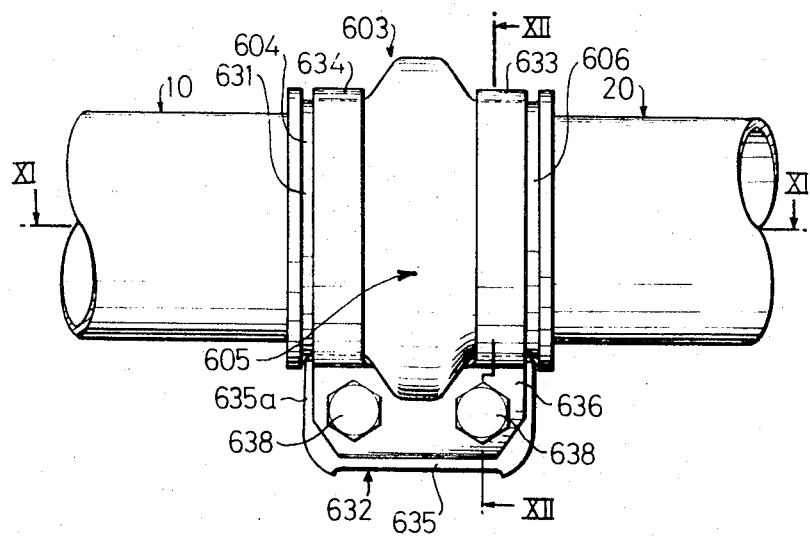
FIG. 10 is a front view of the third embodiment.

In the illustrated third embodiment, the band 632 has, as shown in FIG. 10, first and second winding portions 633 and 634 which are separately wound on the outer peripheries of coupling portions 604 and 606 of the joint body 603. Right end parts, as viewed in FIG. 12, of both the winding portions 633 and 634 are connected by a common connecting piece or portion 635, while left end parts are connected by a common connecting piece or portion 636. Both the connecting pieces or portions 635 and 636 are brought together below the interconnection of the first and second tubes 10 and 20. Further, common bolt holes 637 and 637 are formed in both the connecting pieces 635 and 636. The band 632 is tightened by bolts 638 and 638 inserted through the bolt holes 637 and 637. In this embodiment, the band 632 and the bolts 638 comprise a set of clamping means.

Figure 11:
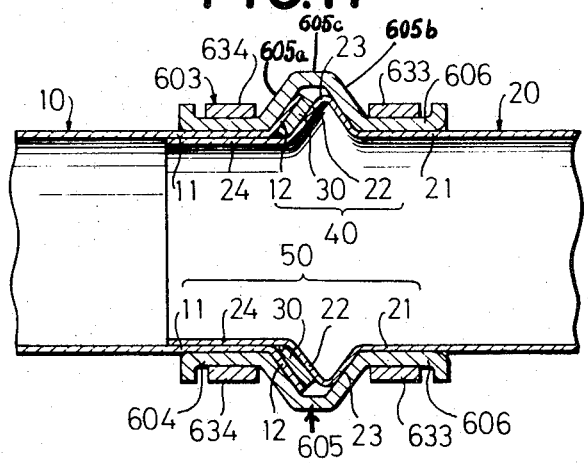
FIGS. 11 and 12 are horizontal and vertical sectional views taken along line XI — XI and XII — XII in FIG. 10, respectively.

Also with the joint body 603 of this embodiment, with the right and left half portions 630 and 631 assembled, as best seen in FIG. 11, the joint body comprises a coupling portion 604 fittedly attached to the coupling portion 11 of the first tube 10, a tightening portion 605 adapted to tighten and pressedly hold the projection 23, the packing 30, and the flange 12 together from both outer sides thereof, toward the central part and a coupling portion 606 fittedly attached to the coupling portion 21 of the second tube 20. As seen in FIG. 12, a clearance 607 is formed between the right and left portions 630 and 631.

The joint body 603 is mounted in such way that the right half portion 630 and the left half portion 631 are fitted around the first and second tubes 10 and 20, then the corresponding winding portions 633 and 634 of the band 632 are wound outside the coupling portions 606 and 604 of the fitted joint body 603, and then the connecting pieces or portions 635 and 636 for the winding portions 633 and 634 are brought together and tightly locked by the bolts 638 and 638.

As assembled, the first and second tubes 10 and 20 are connected by the tightening force of the band 632 through the coupling between the coupling portion 11 of the first tube 10 and the coupling portion 604 of the joint body 603 and through the coupling between the coupling portion 21 of the second tube 20 and the coupling portion 606 of the joint body 603. In addition, the portions 605a and 605b the tightening portion 605 of the joint body 603 are kept in contact with the external side of the flange 12 of the first tube 10 and the external side of the flange portion 25 of the tube 20 respectively second, so as to tighten and pressedly hold the sides projection 23, the packing 30, and the flange 12 together. Thus, airtightness is obtained between the first tube 10 and the second tube 20.

In FIGS. 10 to 12, 635a designates a rib provided at the right connecting piece 635 of the band 632, while 636a indicates a rib disposed at the left connecting piece 636.

In any of the first, second and third embodiments, the coupling force for the first and second tubes 10 and 20 and the joint body and the airtightness retaining force for tightening and pressedly holding the projection 23, the packing 30, and the flange 12 together are increased by increasing the tightening force of the clamping means.

The present invention can be adopted irrespective of the materials (metals, synthetic resins and so forth) of which the pipes are made.

What we claim is:

1. A pipe joint comprising:
   a first tube, a first flange at one end of said first tube,
   a second tube, an annular projection on said second tube adjacent one end thereof, one portion of said annular projection being a second flange,
   a packing interposed between said first and second flanges,
   a joint body, said joint body having a coupling portion at each end thereof and a raised projecting portion between said coupling portions, one of said coupling portions abutting and extending over a substantial portion of the annular periphery of a portion of said first tube adjacent said one end thereof, and the other coupling portion abutting and extending over a substantial portion of the annular periphery of a portion of said second tube adjacent said annular projection, said raised projecting portion abutting and extending over a substantial portion of said first flange and the portion of said annular projection other than said second flange, and
   clamping means for clamping said joint body to said first and second tubes.

2. The pipe joint as claimed in claim 1 wherein said annular projection is substantially V-shaped in longitudinal cross-section with the bottom of the V being radially outward of the top of the V, and said second flange being one of two legs of the V.

3. The pipe joint as claimed in claim 2 wherein:
   said one leg of the V is the leg of the two legs which is closest to said one end of said second tube.

4. The pipe joint as defined in claim 1, wherein said joint body comprises two separate members each of which extends around substantially one half the circumference of the portions of each of said first and second tubes, a receiving pawl channel shaped in section on one end of one of said members and a flange on the other end of said one member, a stopper pawl on one end of the other of said members, said stopper pawl engageable with said receiving pawl, a flange on the other end of said other member to face said flange on said one member.

5. The pipe joint as defined in claim 4, further comprising ribs on each end of each of said members.

6. The pipe joint as claimed in claim 1 wherein said joint body comprises two separate members each of which extends over substantially one half the circumference of the portion of each of said first and second tubes, a flange on each circumferential end of each of said members, each flange on one of said members facing a corresponding flange of the other of said members.

7. The pipe joint as claimed in claim 1, wherein said joint body comprises two separate members each of which extends over substantially one half the circumference of the portion of each of said first and second tubes, a flange on one end of each of said members, and the flange on one of said members faces the flange on the other of said members.

8. The pipe joint as defined in claim 7, wherein said clamping means comprises a tightening band.

9. The pipe joint as claimed in claim 8 wherein said tightening band comprises a first portion abutting and extending over a substantial portion of one of said coupling portions of said joint body and a second portion abutting and extending over a substantial portion of the other coupling portion of said joint body and two longitudinal connecting portions, one of said connecting portions connecting one end of said first portion to one end of said second portion, the other of said connecting portions connecting the other end of said first portion to the other end of said second portion, a bolt hole through each of said connecting portions, said clamping means further comprises a bolt and a nut on said bolt, said bolt passing through each of said bolt holes with the connecting portions clamped between the head of the bolt and said nut.

10. The pipe joint as claimed in claim 1 wherein said clamping means comprises a nut and a bolt.

11. The pipe joint as claimed in claim 1 wherein said annular projection is spaced from said one end of said second tube, and the portion of said second tube between said annular projection and said one end is a spigot.

12. The pipe joint as claimed in claim 1 wherein said raised projecting portion comprises first, second, and third portions, said first portion abuts and extends over a substantial portion of said first flange, said second portion abuts and extends over a substantial portion of the portion of said annular projection other than second flange, and said third portion extends longitudinally and interconnects said first and second portions.

13. The pipe joint as claimed in claim 1 wherein: said first flange is an annular flange, said second flange is an annular flange, said packing is annular, and said joint body is substantially tubular.

14. A pipe joint comprising:
a first tube, a first annular flange at one end of said first tube,
a second tube, an annular projection on said second tube spaced from one end thereof, one portion of said annular projection being a second annular flange, the portion of said second tube between said one end thereof and said annular projection being a spigot,
an annular packing interposed between said first and second flanges,
a substantially tubular joint body, said joint body having a substantially tubular coupling portion at each end thereof and a raised projecting portion between said coupling portions, one of said coupling portions abutting and extending over substantially the entire annular periphery of a portion of said first tube adjacent said one end thereof, and the other of said coupling portions abutting and extending over substantially the entire annular periphery of a portion of second tube adjacent said annular projection, said raised projecting portion having first, second, and third portions, said first portion abutting and extending over substantially the entire annular periphery of said first flange, said second portion abutting and extending over substantially the entire annular periphery of the portion of said annular projection other than said second flange, said third portion interconnecting said first and second portions, and clamping means for clamping said joint body to said first and second tubes.

15. A pipe joint comprising:
a first tube, a first annular flange at one end of said first tube, said first annular flange extending radially outwardly and longitudinally away from said one end of said first tube at an angle relative to the longitudinal center line of said first tube,
a second tube, an annular projection on said second tube adjacent one end thereof, said annular projection being substantially V-shaped in longitudinal cross-section with the bottom of the V being radially outward of the top of the V, one portion of said annular projection being a second annular flange, said second flange being one of the two legs of the V of the annular projection which is closest to said one end of said second tube, said second flange extending radially outward from said second tube at an angle relative to the longitudinal center line of said second tube, said angle being substantially the same as the angle of said first flange,
an annular packing interposed between said first and second flanges,
a substantially tubular joint body, said joint body having a substantially tubular coupling portion at each end thereof and a raised projecting portion between said coupling portions, one of said coupling portions abutting and extending over substantially the entire annular periphery of a portion of said first tube adjacent said one end thereof, and the other of said coupling portions abutting and extending over substantially the entire annular periphery of a portion of said second tube adjacent the leg of the V-shaped annular projection most remote from said one end, said raised projecting portion having a first portion, a second portion and a third substantially tubular portion, said first portion abutting and extending over substantially the entire annular periphery of said first flange, said second portion abutting and extending over substantially the entire annular periphery of the leg of the V-shaped annular projection most remote from said one end of said second tube, said third substantially tubular portion interconnecting said first and second portions, and
clamping means for clamping said joint body to said first and second tubes.

* * * * *